12/4/84 XR 4,486,751

United States Patent [19]

Mole et al.

[11] Patent Number: 4,486,751

[45] Date of Patent: Dec. 4, 1984

[54] ELECTRONIC IDENTIFICATION SYSTEM

[76] Inventors: Alain M. Mole, 138, Ave. Ambroise Croizat, 38400 Saint Martin d'Heres; Jean-Louis P. J. Savoyet, La Mayrie, 38770 La Motte d'Aveillans, both of France

[21] Appl. No.: 377,315

[22] Filed: May 12, 1982

[30] Foreign Application Priority Data

May 12, 1981 [FR] France ........................ 81 09452

[51] Int. Cl.[3] ........................ E05B 49/00; H04Q 3/00; G07F 7/08

[52] U.S. Cl. ........................ 340/825.31; 70/278; 235/382

[58] Field of Search ........................ 235/380, 382; 340/825.31, 825.34, 825.56; 70/278, 277

[56] References Cited

U.S. PATENT DOCUMENTS 3,859,634 1/1975 Perron et al. .................. 340/149 A
3,872,435 3/1975 Cestaro .................. 340/147 MD
3,906,460 9/1975 Halpern .................. 340/172.5
3,944,976 3/1976 France .................. 340/146.2
4,004,133 1/1977 Hannan et al. .................. 235/61.7 B
4,031,434 6/1977 Perron et al. .................. 361/172
4,412,216 10/1983 Mole et al. .................. 340/825.31

*Primary Examiner*—Donald J. Yusko
*Attorney, Agent, or Firm*—David B. Harrison

[57] ABSTRACT

The identification system consists of an electronic key comprising a passive memory area (10) and a shift register (9) and a lock capable of being coupled with the key. The lock is capable of supplying a pulse causing the code contained in the memory (10) to be loaded into the register (9). The register (9) is looped on itself via connection (113). Before reading the contents of the register (9) a set number of clock pulses, counted by the control circuit (149) and transmitted by the electronic lock on the H terminal, produces a series of permutations of the contents of the shift register (9). After this permutation phase, the AND gate (157) allows the data contained in the shift register (9) to flow out through the output terminal S due to the action of additional read pulses the number of which is equal to the number of bits in the register (9).

15 Claims, 3 Drawing Figures

ELECTRONIC IDENTIFICATION SYSTEM

Figure 1:
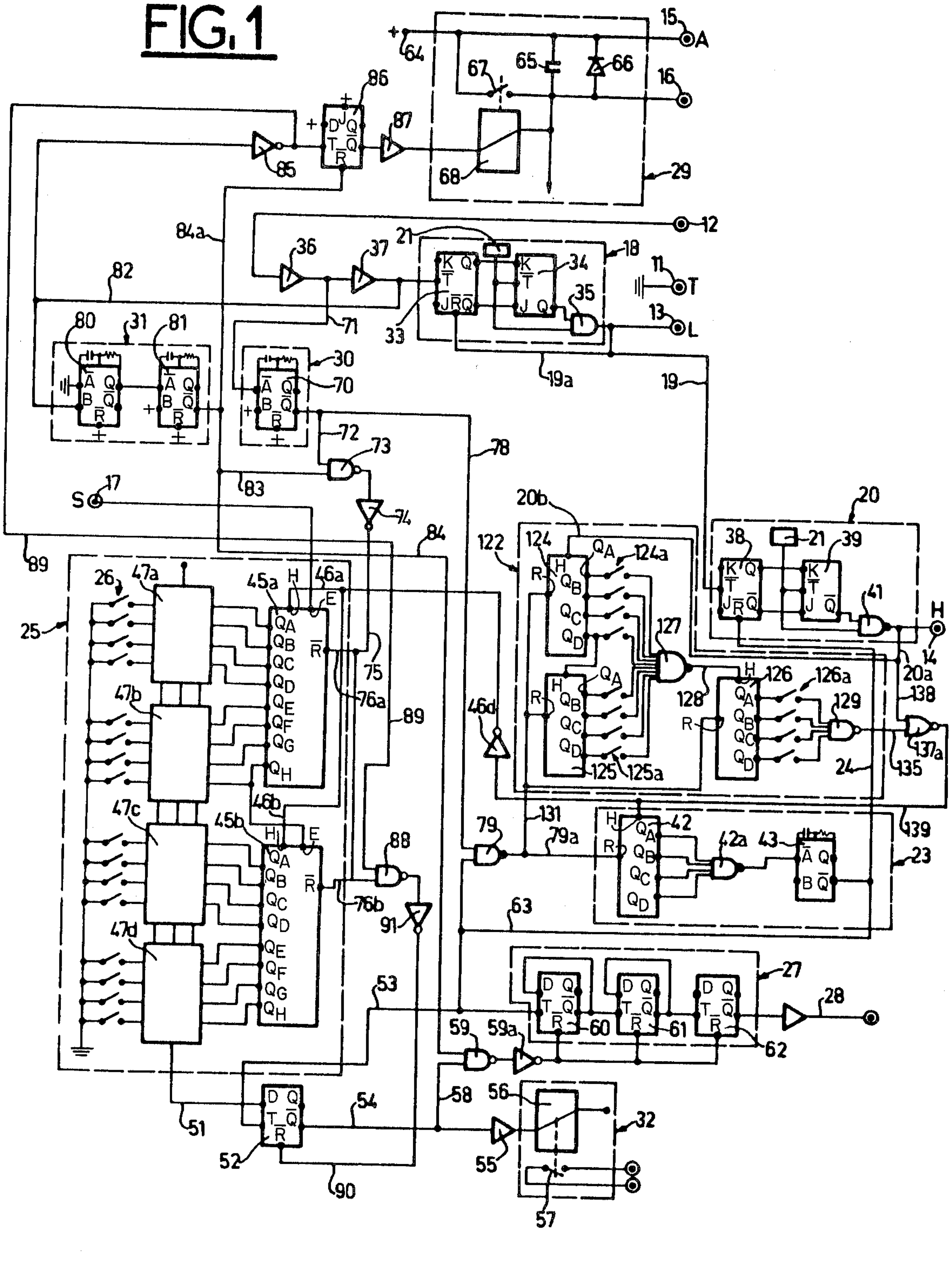

This invention relates to a system for identifying a person, for example, with a view to operating an electrical, mechanical or other type of appliance. Systems of this type for identifying or recognizing persons have many applications. They are used in particular for opening doors, time control, running appliances used by several people like copying machines or, again, in systems for dispensing bank notes by credit cards.

In certain identification systems of conventional type a movable part is used which comprises an identification code and which comes in the shape of a badge or of a credit card that the person to be identified carries around with them (see, for example, the U.S. Pat. No. 3,637,994). The identification code takes the material form either of perforations or of a magnetic band on the badge. The use of such badges has many drawbacks. Indeed they are relatively bulky and can be easily damaged. In the case of perforated badges the code is relatively easy to recognize. When the identification code medium is magnetic the magnetic band can be damaged by scoring or by the action of magnets. Furthermore, the appliance used to read badges of this type is necessarily complex and must, in particular, include a mechanical drive system enabling the badge to be moved for its identification code to be read. The result is that the reading appliances have a high construction cost.

In other identification systems a movable part is used in the form of an electronic key similar to a conventional key but comprising means for memorizing an identification code which can be detected and recognized by a reading system like a lock but consisting of a set of electronic circuits (see, for example, U.S. Pat. No. 4,038,637).

In French patent No. 2 363 837 a system is used having a key with a programmable memory in which the identification code can be contained in a shift register housed in the electronic key. The data contained in the key can be read by the electronic lock by means of pulses supplied by a clock contained in the said lock. The data thus obtained are compared with a code stored in the key in such a manner as to determine the identicality of the two codes and control, for example, the opening of a latch or any other required operation.

In this system, however, there is a high risk of fraudulent duplication of the electronic key, the shift register of which enabling the identification code to be determined can be read relatively easily by a technician familiar with this type of device.

An object of the present invention is thus an identification system which does not have the shortcomings of the identification systems at present in use and known, one in which the movable part analogous to a key is inert, so that simply reading the shift register contained in the key does not allow the identification code to be determined in a simple manner.

Another object of the invention is such a system in which the reading process produces one or more modifications of the contents of this memory, thus making any fraudulent duplication extremely difficult.

The electronic identification system according to the invention comprises a movable part having a preprogrammed passive memory area containing an electronic identification code, connected to a readable memory which can, for example, consist of a parallel-to-serial shift register. The system also comprises a fixed part analogous to an electronic lock capable of being coupled with the movable part and comprising electric power supply means, electronic means for supplying a pulse causing the electronic identification code to be loaded into the readable memory of the said movable part, electronic means for reading the contents of the movable part's readable memory and transferring it into a memory in the fixed part and means of comparison with a code preprogrammed into the said fixed part. According to the invention the readable memory of the movable part is looped back on itself. The means for reading the contents of the said memory are designed to transmit a set number of clock pulses which differ by a multiple from the number of bits of the said memory and each time produce a permutation of its contents. A logic gate is also provided in the movable part or in the fixed part so as to enable the transfer of the contents of the said memory in the movable part to the fixed part memory only after a set number of the above-mentioned clock pulses have been transmitted.

In this way the contents of the movable part memory are no longer read by simply transferring the serial signal to the fixed part memory bit by bit by means of a number of read pulses which is exactly equal to the number of bits of the movable part memory. On the contrary a certain number of permutations of the contents of the movable part memory are produced before its contents are read.

In this way the security of the identification system of the invention is considerably enhanced, since only the electronic lock can know the result of this set number of permutations.

In a preferred embodiment of the invention the fixed part comprises a clock modulation circuit for counting the above-mentioned set number of clock pulses transmitted by a read circuit. The clock modulation circuit is connected to a read stop circuit so as to additionally enable the transmission of an additional number of clock pulses or read pulses equal to the number of identification code bits.

The movable part can also comprise means for counting the set number of successive clock pulses transmitted by the fixed part and a logic gate in order to only allow transfer of the contents of the movable part memory to the fixed part memory after transmission of the above-mentioned set number of clock pulses producing the permutations which have just been indicated.

In a variant it is the fixed part which comprises a logic gate receiving the output signal from the movable part memory as well as the output from the clock modulation circuit. It will be understood that this simpler variant in actual fact allows the same result to be obtained.

The means for generating a loading pulse contained in the fixed part or electronic lock comprise a loading circuit which is advantageously provided with a master-slave type double flip-flop combined with a NAND gate receiving clock pulses and supplying a loading pulse.

The electronic means contained in the fixed part in order to read the contents of the movable part shift register preferably comprise a reading circuit which is advantageously provided with a master-slave type double flip-flop combined with a NAND gate receiving the above-mentioned clock pulses and connected to the output of the means supplying the loading pulse. In this way the reading circuit is triggered after the loading pulse has been transmitted and supplies successive pulses which first of all permit a series of permutations of the contents of the movable part shift register followed by the serial reading of the data contained in the said parallel-to-serial shift register.

A read stop circuit enables the number of read pulses to be limited to the exact number of bits contained in the movable part shift register after the permutation phase. This read stop circuit advantageously comprises a pulse counter receiving the read pulses coming from the read circuit when the additional number of pulses counted after the permutation phase corresponds to the number of bits of the shift register, i.e. when the contents of the movable part shift register have been read once.

The movable part memory area preferably comprises a plurality of switches which may be implemented, for example, as fuses or by destructible connections the position of which determines the electronic identification code. Each flip-flop in the movable part shift register is associated with one of the switches whose position controls its state via two NAND gates receiving the loading pulse on one of their inputs. The first of the above-mentioned NAND gates is connected via its other input to the switch with which it is associated. The second NAND gate receives the output from the first gate on its other input.

Thus, as soon as the loading pulse arrives at one of the inputs of the two NAND gates, each shift register flip-flop goes into a state which corresponds to the state of the switch with which it is associated. The result is that the identification code, initially represented by the position of the plurality of switches, is transferred into the various shift register flip-flops due to the action of the loading pulses.

In an advantageous embodiment the system may also comprise, in the fixed part, a successive tests enabling circuit. This circuit comprises a succession of flip-flops whose resetting to zero depends on the positive result of the comparison performed by the means of comparison with the code preprogrammed into the fixed part. In this way a number of unsuccessful tests is enabled which equals the number of flip-flops in this succession of flip-flops before the alarm is set off.

Suitable timing means may also be provided for resetting all the system's flip-flops to zero when the key is inserted and after uncoupling.

Figure 2:
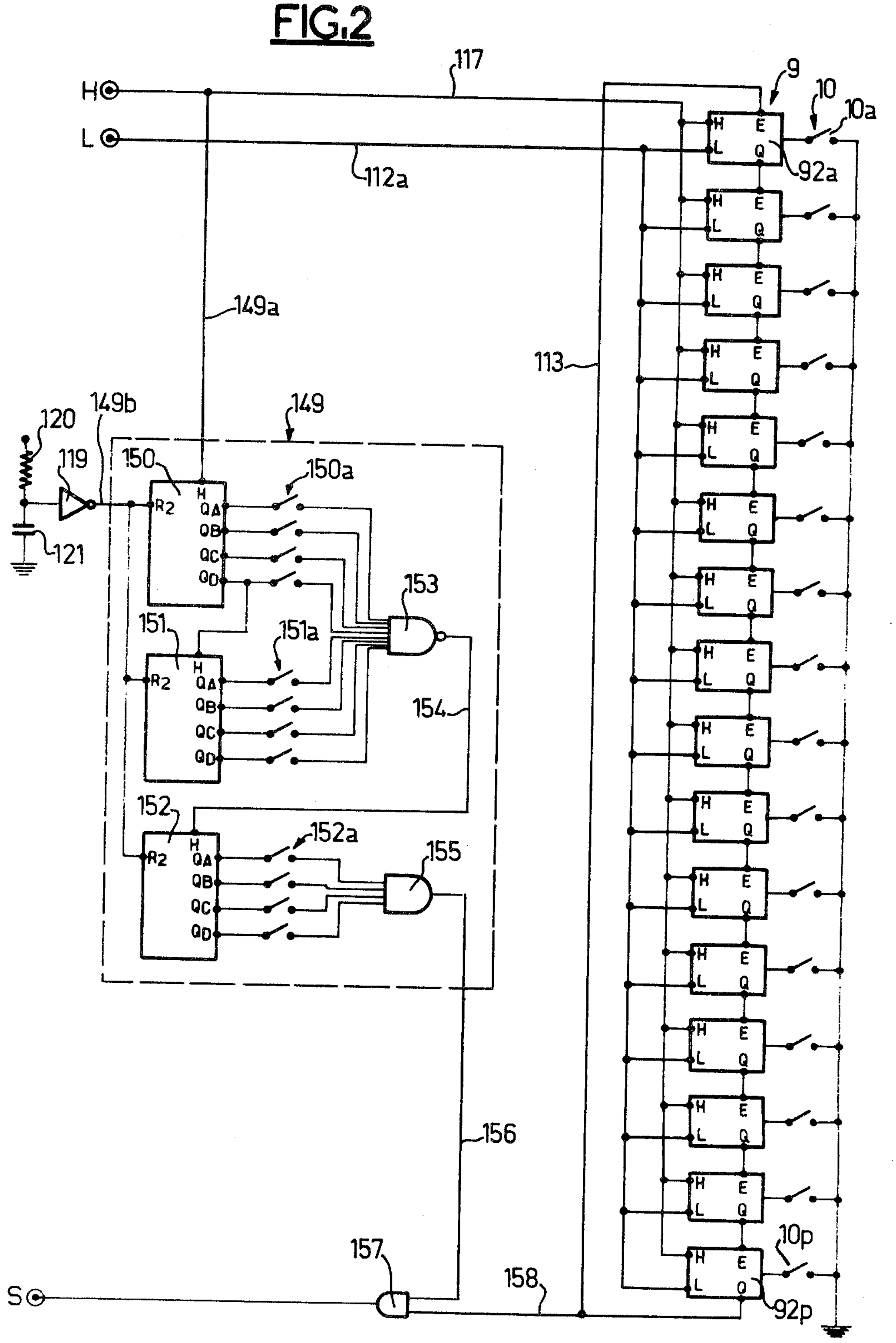
Figure 3:
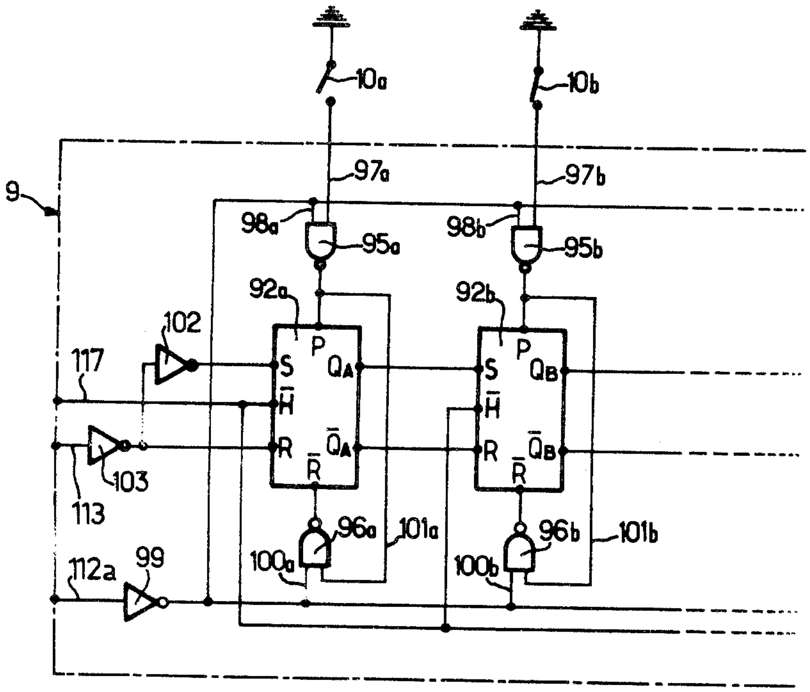

The invention will be more clearly understood on studying several embodiments taken as non-restrictive examples and illustrated by the appended drawings, in which:

FIG. 1 schematically shows the main elements of the fixed part or electronic lock of an identification system according to the invention designed to control a door latch;

FIG. 2 schematically shows the movable part or electronic key designed to be coupled with the fixed part shown in FIG. 1;

FIG. 3 is a detailed part view of the shift register of the movable part in FIG. 2, showing the identification code loading control circuit.

In the examples illustrated so-called negative logic has been used, i.e. logic in which by convention level 1 has been adopted for the earth (ground) potential and level 0 for the supply voltage which is preferably very low, around +5 volts. The current demand remains limited to a few milliamperes in order to avoid any danger to the user.

As it is shown in FIGS. 1 and 2 in particular the identification system of the invention comprises a transportable movable or detachable part or electronic key shown in FIG. 2 and a fixed part or electronic lock shown in FIG. 1. The detachable part comes as a conventional key. It may be formed advantageously of a small fibre glass plate sandwiched between two thicknesses of hard plastics material having good resistance to solvents and to extreme temperatures. So the electronic key is very strong and its wear negligible compared with the wear of a conventional type of badge.

The electronic key comprises a number of electrical contacts formed by conducting elements buried in the plastics material engaging, on the side of the fixed part acting as the electronic lock, with steel balls held by springs and not shown in the figures. It is also possible to make these contacts in some other way, for example by an opto-electronic connection.

It can be seen in FIG. 2 that the electronic key shown schematically comprises a parallel-to-serial shift register marked 9 overall, driven by a succession of sixteen switches 10 connected to earth by means of the lock and whose open or closed position specifies the identification code bits as a whole. The switches 10 may, for example, consist of connections some of which have been destroyed initially so breaking the electrical connection between the two terminals. The main key terminals only have been shown in FIG. 2.

It can be seen in FIG. 1 that terminals 11 and 12 connected together in the key by a link which is not shown, are designed to be connected to the system earth (T). The L terminal marked 13 is designed to receive a pulse loading the code contained in the whole set of switches 10 to the register 9. The H terminal marked 14 is designed to receive a succession of pulses permitting the data contained in shift register 9 to be read. The A terminals 15 and 16, connected together in the key by a link which is not shown, are designed to be connected to the electric power supply located in the lock. Finally, the S output terminal marked 17 is connected to the Q output of shift register 9.

It will be noted at once that the electronic key is passive and has no power supply source. So long as it is not coupled to the lock the shift register 9 contains no data and if it is read it cannot supply the identification code.

The electronic lock illustrated in FIG. 1 comprises a loading circuit marked 18 overall, whose input is connected to terminal 12 when the key is coupled with the lock, i.e. with the system earth, and whose output supplies a loading pulse on the L terminal.

The loading circuit output 18 is also connected via connection 19 to the input of a reading circuit marked 20 overall and supplying on the H terminal a succession of pulses transmitted by a clock circuit 21.

The output of the reading circuit 20 is also linked by connections 20*a* and 20*b* to the input of a clock modulation circuit 122 whose output is linked by connections 135 and 139 to the input of a read stop circuit marked 23 overall. The output from the read stop circuit returns via connection 24 to the reading circuit 20 so as to deliver a read stop pulse stopping the transmission of clock pulses to the H terminal when the contents of shift register 9 have been read once, i.e. when a total number of sixteen read pulses have arrived at the H terminal.

The S terminal linked to the Q output of the shift register 9 receives the serial signal representing the data contained in shift register 9. The S terminal is connected to the E input of a circuit 25 performing a serial-to-parallel conversion and a comparison of the read data coming from the key with an identification code preprogrammed into the electronic lock itself and consisting in the illustrated example of a set of preprogrammed switches 26.

The electronic lock also contains, in the illustrated example, a successive tests enabling circuit 27 linked by an output connection 28 to an alarm device which is actuated after four successive unsuccessful tests. A circuit 29 connected to the key's A terminals provides for stabilization of the +5 volts power supply.

A first zero resetting circuit 30 resets all the electronic key's system's flip-flops and counters to zero when the key is coupled with the lock.

A second resetting circuit 31 causes all the flip-flops and counters to be reset to zero and the power supply to be cut off when the key is uncoupled.

Finally, a latch control circuit 32 receives a signal when the comparison carried out in circuit 25 is positive.

We shall now describe the different circuits which have just been reviewed, in greater detail.

The loading circuit 18 comprises a master-slave double flip-flop made up of a first flip-flop 33 or "master" and a second flip-flop 34 or "slave". The two flip-flops 33, 34 are connected together in conventional manner, with the second flip-flop 34 receiving, on its $\overline{T}$ input, the clock signal from the clock circuit 21. The Q output of flip-flop 34 is connected to one of the inputs of NAND gate 35 which also receives the clock signal on its second input.

The $\overline{T}$ input of the first flip-flop 33 is connected by means of two timers 36 and 37 to the system earth by means of terminal 12 connected to the T terminal when the key is coupled with the lock. In these circumstances the system effectively operates in negative logic.

The read circuit 20 is of the same type as the loading circuit 18 and it comprises, like this latter, a master-slave double flip-flop 38, 39 mounted in the same way. The $\overline{T}$ input of the first flip-flop 38 receives the loading pulse via connection 19. The NAND gate 41 connected to the output of the second flip-flop in the same way as the NAND gate 35 in the loading circuit 18 therefore supplies a succession of pulses on the H terminal; in the following description these pulses are called clock pulses or read pulses.

The output from the NOR gate 137a is linked by connection 139 to the read stop circuit 23 which comprises a counter 42 the $Q_A$, $Q_B$, $Q_C$ and $Q_D$ outputs of which are connected to the input of a NAND gate 42a. The output from gate 42a is connected to the $\overline{A}$ input of a monostable 43.

The output pulses from NAND gate 41 or clock pulses arriving at the H terminal and sent via NOR gate 137a to the H input of counter 42 are counted until the number 16 is reached corresponding in the illustrated example to the number of bits in the key's shift register, i.e. to the number of switches 10. When this number has been reached, the $\overline{Q}$ output of monostable 43 delivers an output signal applied via connection 24 to the drive input $\overline{R}$ of the first flip-flop 38 of the reading circuit 20 resetting this flip-flop to zero and thus stopping the read pulses transmitted by circuit 20.

By this means we therefore have all the bits of shift register 9 read off.

The serial signal arriving on the S terminal and representing the contents of register 9 feed the E input of a serial-to-parallel converter comprising two serial-to-parallel shift registers 45a and 45b contained in the conversion and comparison circuit 25. In order to synchronize the serial-to-parallel conversion performed in the two registers 45a and 45b with the reading of the shift register 9 the clock pulses or read pulses are also applied, via connections 46a and 46b along with inverter 46d connected to the output of NOR gate 137a, to the H inputs of the two registers 45a and 45b. The comparison code preprogrammed into the fixed part or electronic lock materialized by the position of switches 26 is compared with the result of the serial-to-parallel conversion in the comparison circuit comprising the four comparators 47a, 47b, 47c and 47d connected in series and also connected on one hand to the different parallel outputs of the two conversion registers 45a and 45b and on the other to the different switches 26 grouped in fours for each of comparators 47a to 47d.

The result of the comparison leaving the last element 47d is a "zero" or "one" signal depending on whether the comparison is negative or positive. The result of this comparison arriving on connection 51 is applied to the D input of flip-flop 52 which also receives the output signal from the read stop circuit 23 on its T input via connections 63 and 53. When the comparison is positive a signal is transmitted by the $\overline{Q}$ output of flip-flop 52 and sent via connection 54 through amplifier 55 to the relay 56 closing the switch 57 of the latch control circuit 32.

At the same time the signal transmitted by the $\overline{Q}$ output of flip-flop 52 is sent via connection 58 to NAND gate 59 whose output is connected through inverter 59a to the zero resetting drive inputs $\overline{R}$ of the three flip-flops 60, 61 and 62 of the successive tests enabling circuit 27 connected in cascade and linked to the alarm control 28. The T input of the first flip-flop 60 receives the output signal from the read stop circuit 23 via connection 63.

If the comparison turns out to be negative a zero signal appears on the input of flip-flop 52 so that the relay 56 is not energized and the latch is not open. However a loading command acts on the T input of the first flip-flop 60 which moves forward one. It can be seen that, owing to the cascade arrangement of flip-flops 60, 61 and 62 four unsuccessful tests are enabled before the alarm 28 is triggered by the successive tests enabling circuit 27.

The power supply stabilization circuit 29 comprises an input terminal 64 connected to the power supply battery, supplying +5 volts for example, contained in the electronic lock but not shown in the figure. The two terminals 15 and 16 designed to engage with the corresponding key terminals are connected through the capacitor 65 and the diode 66.

When the key is coupled to the electronic lock the current flows between the two terminals 15 and 16. The switch 67 closes due to the action of relay 68 so that virtually no current flows through the key any more. In these circumstances the supply to the electronic lock circuit as a whole is not disturbed, notably if there are any key vibrations.

The electronic key also comprises, in a first zero resetting circuit 30, a monostable 70 which receives the output signal from timer 36 on its $\overline{A}$ input via connection 71. Under these conditions the monostable 70 reacts to a signal having a falling edge on connection 71, i.e. when the key is coupled. The $\overline{Q}$ output of monostable 70 is connected by link 72 to one of the inputs of NAND gate 73. The output signal from NAND gate 73 enables, through inverter 74 and via connections 75, 76a and 76b, the two registers 45a and 45b of the serial-to-parallel conversion circuit 25 to be set to zero by their drive inputs $\overline{R}$. The $\overline{Q}$ output from monostable 70 is also connected by connection 78 to one of the inputs of NAND gate 79 which receives the output signal from the read stop circuit 23 on its other input. The output from NAND gate 79 resets counter 42 to zero through connection 79*a*.

Circuit 31 for resetting to zero when reading ends on withdrawal of the key comprises two monostables 80 and 81 connected in cascade, with the Q output of monostable 80 being connected to the $\overline{A}$ input of monostable 81. The first monostable 80 receives the output signal of timer 37 on its B input via connection 82 and, because of this arrangement, reacts to a signal having a rising edge on connection 82, i.e. when the key is uncoupled. The $\overline{Q}$ output of the second monostable 81 which supplies a very short pulse is connected via connection 83 to the second input of NAND gate 73 which leads, as was seen before, to the resetting to zero of the serial-to-parallel conversion circuit 25. The $\overline{Q}$ output of monostable 81 is also linked by connection 84 to one of the inputs of NAND gate 59 so as to reset flip-flops 60, 61 and 62 of the successive tests enabling circuit 27 to zero when the key is uncoupled.

When the key is being uncoupled, the rising front signal on connection 82 at the output of timer 37 applied via inverter 85 to the T input of flip-flop 86 produces, by means of amplifier 87 connected to its $\overline{Q}$ output, triggering of relay 68 of the power supply circuit 29 so that the power supply gets cut off. Flip-flop 86 is reset to zero through its $\overline{R}$ input via connection 84*a* connected to the $\overline{Q}$ output of monostable 81 when the key is uncoupled from the lock.

In addition it will be noted that NAND gate 88 receives on its two inputs respectively the output signal from NAND gate 73 via inverter 74 and connection 75 and the output signal from inverter 85 via connection 89. The output signal from NAND gate 88 enables flip-flop 52 to be reset to zero by its $\overline{R}$ input by means of connection 90 and inverter 91 at the time the key is uncoupled after the time delay of timer 37 has expired.

The detailed structure of the key's shift register 9 and of the set of switches 10 acting as a preprogrammed memory is partly illustrated in FIG. 3. Switch 10*a* is shown open which, in the negative logic chosen as an example for the circuit in FIG. 2, corresponds to a "one" signal. Switch 10*b* connected to earth is shown closed which corresponds to a "zero" signal. The other switches have not been shown in FIG. 3. In this figure we also find the first two flip-flops 92*a* and 92*b* corresponding to the first two bits of shift register 9 and receiving on their $\overline{H}$ inputs the clock signals or read pulses coming from the lock's read circuit 20 via connection 117 also illustrated in FIG. 2. The various flip-flops 92*a*, 92*b*, etc. are connected together in cascade in the normal way, with the Q and $\overline{Q}$ outputs of each upstream flip-flop being connected to the S and R inputs of the next flip-flop down so as to produce the shift register 9.

Two NAND gates 95*a* and 96*a* are combined with flip-flop 92*a*, with the outputs of the two NAND gates being connected respectively to the P input putting flip-flop 92*a* into the "one" state and to the $\overline{R}$ input putting flip-flop 92*a* into the "zero" state.

The first NAND gate 95*a* is connected by its first input through connection 97*a* to switch 10*a* and by its second input through connection 98*a* to the output of inverter 99 which receives the loading pulse through terminal L via connection 112*a* which can also be seen in FIG. 2.

The output from inverter 99 is also connected via connection 100*a* to one of the inputs of NAND gate 96*a* which receives the output from NAND gate 95*a* on its other input via connection 101*a*.

The same elements marked with the suffix "b" are combined with flip-flop 92*b* and with switch 10*b*. We also find the same elements for each following flip-flop corresponding to each bit in the shift register 9.

In the case of switch 10*a*, a "one" signal is applied on input 97*a* of NAND gate 95*a*. Owing to the presence of inverter 99, the negative loading pulse produces a "one" signal on the second input 98*a* which produces a "zero" signal on the output of NAND gate 95*a*. This "zero" signal is applied to input 101*a* of the second NAND gate 96*a* which receives a "one" signal on its other input and leads to a "one" signal appearing on the zero resetting input $\overline{R}$ of flip-flop 92*a*. Inspection of the circuit combined with flip-flop 92*b* shows that the closed position of switch 10*b* produces in flip-flop 92*b* an opposite state to the state of flip-flop 92*a*. In these circumstances the arrival of a loaading pulse on the L terminal leads to transfer of the identification code materialized by the position of the various switches 10 in the form of the state of the different flip-flops 92 which may then be read serially by the read signals applied to the $\overline{H}$ inputs. If there is no loading pulse all the flip-flops stay in the zero state in the illustrated example.

The drive inputs S and R of the first flip-flop 92*a* are also linked by inverters 102 and 103 to connection 113 which can also be seen in FIG. 2.

Referring to FIG. 1 again it is seen that the clock modulation circuit 122 comprises a set of three counters 124, 125 and 126. The first counter 124 receives on its H input the clock pulses or read pulses transmitted by the read circuit 20. Four switches 124*a*, which can be reprogrammed, define by their positions a set number and are linked to the $Q_A$, $Q_B$, $Q_C$ and $Q_D$ outputs of counter 124. The second counter 125 receives the $Q_D$ output from the first counter 124 on its H input. It is also associated with four switches 125*a* the position of which also specifies a set number and which are connected to the $Q_A$, $Q_B$, $Q_C$ and $Q_D$ outputs of counter 125. A NAND gate 127 receives on its various inputs all the connections from the eight switches 124*a* and 125*a*. The output from gate 127 is connected via connection 128 to the H input of the third counter 126 which is also combined with four switches 126*a* as is the case for the two counters 124 and 125. The connections of the four switches 126*a* are connected to the inputs of a NAND gate 129.

The arrangement of these different means results in the output from gate 129 transmitting a signal after transmission of a number of clock pulses by circuit 20 which depends on the position of the various switches 124*a*, 125*a* and 126*a*. The number defined by the first two counters 124 and 125 corresponds to the number of read pulses within a cycle. The number defined by counter 126 corresponds to the number of cycles. The total number defined by the modulation circuit 122 as a whole is the product of these two numbers. Of course other means could be used for this counting operation.

It will be noted that the three counters 124, 125 and 126 are reset to zero by their R inputs via connection 131 linked to the output of NAND gate 79 which is controlled by the zero resetting circuit 30.

When the number of clock pulses thus determined has been transmitted by the read circuit 20, the output signal from NAND gate 129 arrives at one of the inputs of NOR gate 137*a* via connection 135. The NOR gate 137*a* receives the clock pulses transmitted by the reading circuit 20 on its second input via connection 138. So long as the number of clock pulses transmitted is not equal to the number set by the three groups of switches 124*a*, 125*a* and 126*a*, the NOR gate 137*a* remains blocked and does not transmit any output signal.

As can be observed on inspection of FIG. 2, the shift register 9 is looped on itself, with its Q output being connected to its E input through connection 113. By means of this arrangement each clock pulse arriving on the H terminal and transmitted by connection 117 to all the H inputs of the various flip-flops 92 of the shift register 9, produces a permutation of the contents of the said shift register each time. After a set number of permutations produced by the clock pulses whose number is set by the three counters 124, 125 and 126 the NOR gate 137*a* opens. New read pulses, still transmitted by the reading circuit via the NOR gate 137*a*, are then sent by connection 139 to the input of the read stop circuit 23 where they are counted.

The key also comprises a circuit 149 checking the number of clock pulses, similar to the lock's clock modulation circuit 122. The control circuit 149 comprises three counters 150, 151 and 152. The first two counters 150 and 151 each combined with four programming switches 150*a* and 151*a* feed a NAND gate 153 which is connected at its output via connection 154 to the input of the third counter 152. The latter is combined with four programming switches 152*a* connected to the four inputs of an AND gate 155. The output from the AND gate 155 is linked by connection 156 to one of the inputs of an AND gate 157 the second input of which is connected by connection 158 to the Q output of the shift register 9. The output of the AND gate 157 is connected to the output terminal S. The clock pulses or read pulses arriving at terminal H are sent to the H input of the first counter 150 via connection 149*a*.

The three counters 150, 151 and 152 are reset to zero by means of a Schmitt trigger 119 linked to the power supply through resistor 120 and to earth through capacitor 121 and connected to the $R_2$ inputs of the three counters 150, 151 and 152 by connection 149*b*. Resetting to zero is therefore carried out at the time the key is uncoupled.

The identification system illustrated in the figures works in the following way. When the key is inserted into the electronic lock, the power supply is switched on to the whole system, with the two terminals 15 and 16 being short-circuited. The clock circuit 21 in the lock transmits successive pulses. After a certain time set by the timer 36 a falling edge signal produces, through monostable 70, a pulse resetting the various lock elements to zero. The output from the second timer 37 delivers a rising edge signal which, after a second time delay, leads to transmission by the loading circuit of a negative-going loading pulse. Via connection 19*a* this pulse causes the master flip-flop 33 of the loading circuit 18 to be reset to zero. Furthermore the arrival on the L terminal of this single loading pulse sent via connection 112*a* leads to the loading of all the flip-flops 92 of shift register 9 which each receive an item of data corresponding to the position of the switch 10 to which they are connected. It should be noted that, for simplicity's sake, in FIG. 2, all the switches 10 have been shown in the open position. In actual fact, of course, some of these switches are in the closed position which defines a code initially preprogrammed into the key.

The loading pulse also sent by connection 19 to the reading circuit 20 initiates the transmission of clock pulses or read pulses by the reading circuit 20. These pulses sent via connections 20*a* and 20*b* to the clock modulation circuit 122 are successively counted by this circuit 122. At the same time the same clock pulses arrive on the H terminal and are sent via connection 117 to the various clock inputs H of the shift register 9 flip-flops, each time leading to a shift of one bit or a permutation of the contents of shift register 9 owing to the loop connection 113.

Furthermore the same clock pulses applied by connection 149*a* to the input of the control circuit 149 are also counted by this circuit. Of course, the programming of the control circuit 149 by means of the three groups of switches 150*a*, 151*a* and 152*a* is the same as the programming of the lock's clock modulation circuit 122 which depends on the position of the three groups of switches 124*a*, 125*a* and 126*a*.

The two counters 150 and 151 of the control circuit 149 play the same role as the two counters 124 and 125 of the clock modulation circuit 122 and count the number of pulses in a cycle. The third counter 152 of the control circuit 149 plays the same role as the third counter 126 of the clock modulation circuit 122 and counts the number of cycles.

So long as no signal arrives at the output of AND gate 155, AND gate 157 stays blocked so that the data contained in shift register 9 is not sent to the S terminal and to the lock's comparison circuit 25.

When the set number of clock pulses has been transmitted by the clock modulation circuit 122 and checked by the control circuit 149 another train of clock pulses or read pulses arrives on the H terminal, their number being counted by the lock's read stop circuit 23. In this position a signal is still transmitted by AND gate 155 so that AND gate 157 is open. The contents of shift register 9 are therefore transferred serially via the S terminal to the lock's comparison circuit 25. This serial signal is converted into a parallel signal by registers 45*a* and 45*b* of circuit 25 and compared with the preprogrammed data materialized by the position of switches 26. It will be noted that, for simplicity's sake, the switches 26 have all been shown open. In actual fact some of them are closed in such a way as to define a preprogrammed code in the lock corresponding to the proprogrammed code in the key after modification by the successive permutations produced by the clock pulses.

It should be noted that, in order to obtain a suitable modification of the contents of shift register 9, it is necessary for the number of clock pulses counted by the clock modulation circuit 122 and checked by the control circuit 149 not to be a multiple of the number of bits in shift register 9. Otherwise one can imagine that the permutation would produce no modification in the contents of shift register 9.

In a first variant the number of pulses determined by the first two counters 124 and 125 of circuit 122 and checked by the first two counters 150 and 151 of the control circuit 149 exceeds the number of bits of shift register 9. In this way the read pulses arriving on the H terminal after the various permutations effectively allow the whole of the contents of shift register 9 to be read without gate 157 being blocked by the lack of a signal on AND gate 155.

In another variant it is, on the contrary, possible to get the third counter 152 reset to zero after the cycle number determined by the switches 152*a* has been counted and to enable only the output of one bit of the shift register 9 by gate 157 every time a number of clock pulses equal to the number set by the three counters 150, 151 and 152 has arrived at the H terminal. In this type of variant it is therefore necessary, in order to read the whole of the contents of shift register 9, to produce as many permutations by the clock modulation circuit 122 as there are bits in register 9 so as to read the whole of the contents of this register.

Although in the example illustrated in the figures a control circuit 149 has been designed in the key it will be understood that it could, in a simplified variant, be possible to eliminate this control circuit provided a logic gate is provided to prevent the transfer of the serial signal representing the contents of shift register 9 before the end of the permutation phase. Such a logic gate could, for example, consist of an AND gate placed in the electronic lock, connected by one of its inputs to the S output terminal and receiving on its other input the output from the clock modulation circuit 122, i.e. in fact the output from NAND gate 129. The input of the comparison circuit 25 would then be connected to this blocking AND gate.

The possibility has been mentioned in this description of modifying the codes by blowing fuses. It will be understood that it would also be possible to modify the codes by using an EEPROM technology, i.e. by means of memories that can be reprogrammed several times and can thus achieve a reversible state change. In this case it also becomes possible to extend the application of the invention by planning for a first part of the code, 24 bits for example, to be fixed, its security being guaranteed by the means of the invention, whilst a second part of the code, 48 bits for example, can be modified as required and several times in order, for example, to manage funds.

In this description the simplified expression "flip-flop" has been used to designate bistable multivibrators. Similarly, the counters mentioned are binary counters.

To sum up, it can be seen that the system described makes it possible to obtain a complex modification of the contents of the shift register of the movable part or electronic key, so that any fraudulent copying of the key is made extremely difficult.

We claim:

1. An electronic identification system comprising:

a moveable part having a preprogrammed passive memory array containing an electronic identification code, and a readible memory connected to said passive memory array and having its output fed back to its input, and a fixed part capable of being coupled with the moveable part and comprising electric power supply means for supplying electric power, electronic means for supplying a pulse to said moveable part thereby causing the electronic identification code to be loaded into the readible memory of the said moveable part, a fixed part memory, said electronic means for reading the contents of the readible memory of the moveable part and transferring them into said fixed part memory and comparison means for comparison with a code preprogrammed into the said fixed part, wherein said electronic means transmits, before the reading operation, a set number of preliminary clock pulses, which is different from a multiple of the number of bits in the said readible memory and which each time leads to a permutation of its contents, and a logic gate for enabling transfer of the contents of said readible memory to the fixed part memory for reading only after transmission of the set number of preliminary pulses.

2. The identification system according to claim 1, characterized in that the moveable part comprises control means for counting said set number of successive preliminary clock pulses and wherein said logic gate is connected to the output of said readible memory and to the output of said control means so as to enable transfer of the contents of the moveable part readible memory to said fixed part memory in the fixed part only after said set number of clock pulses.

3. The identification system according to claim 1, characterized in that the fixed part comprises a clock modulation circuit for counting said set number of preliminary clock pulses transmitted by the said electronic means, with the said modulation circuit being linked to a read stop circuit so as to additionally enable the transmission of an additional number of read pulses equal to the number of bits in the readible memory of the moveable part subsequent to said set number of preliminary clock pulses.

4. The identification system according to claim 3, characterized in that the clock modulation circuit and the control means comprise a set of counters associated with one or more logic gates.

5. The identification system according to claim 1 characterized in that the said electronic means for transmitting a loading pulse comprise a loading circuit provided with a master-slave type double flip-flop associated with a NAND gate and a clock supplying loading pulses to said double flip-flop and said NAND gate.

6. The identification system according to claim 1, characterized in that the electronic means for reading the contents of the readible memory of the moveable part comprise a clock, a reading circuit provided with a second master-slave type double flip-flop associated with a second NAND gate receiving the pulses from said clock and connected to the output of said electronic means supplying the loading pulse in such a way as to supply successive read pulses.

7. The identification system according to claim 1, characterized in that the electronic means of the fixed part also comprises a read stop circuit provided with at least one pulse counter and a monostable multivibrator connected to the output of the reading means and capable of delivering a read stop pulse when the contents of the moveable part readible memory have been read once.

8. The identification system according to claim 1, characterized in that the memory array in the moveable part comprises a plurality of switches whose positions determine said electronic identification code and said readable memory comprises a plurality of flip-flops wherein each said flip-flop is connected via two NAND gates with one of the switches whose position controls the state of the connected flip-flop, with one common input of both gates receiving said loading pulse and with the first of the said gates being connected by its other input to the switch and with the second gate receiving the output from the first gate on its other input.

9. The identification system according to claim 1, characterized in that it also comprises an alarm and a successive tests enabling circuit connected to the alarm and provided with a succession of flip-flops which are reset to zero when said comparison means tests for and successfully determines equivalence between said electronic identification code and the code preprogrammed into the fixed part so that when a number of unsuccessful tests performed by said comparison means equals the number of flip-flops of the said succession of flip-flops, said alarm is thereby triggered.

10. The identification system according to claim 1, characterized in that said fixed part memory comprises system resettable memory and said system also comprises first timing means connected to a monostable multivibrator for resetting all the system's resettable memory after the moveable part has been coupled with the fixed part and before transmission of the loading pulse.

11. The identification system according to claim 10, characterized in that it also comprises second timing means connected to a set of monostable multivibrators for resetting all the system's resettable memory and cutting off the power supply of the fixed part after the moveable part has been uncoupled from the fixed part.

12. An electronic identification system comprising a fixed electronic receptacle and a portable electronic key adapted to be inserted into a portion of said receptacle and thereby electrically connected thereto, said portable electronic key comprising a clockable multiple stage internal shift register configured as a recirculating ring counter which is provided with an initial predetermined bit pattern and which has a common clocking input connection and a serial bit stream output connection, each being connectable to said receptacle, said electronic receptacle comprising:

initialization means for initializing said system when said key becomes electrically connected to said receptacle, clock pulse generation means responsive to said initialization means for generating and putting out to said key at least two clock pulse groups including an initial group and a read group during a subsequent read interval, wherein said initial pulse group is not a multiple of the number of stages of said shift register so that after said initial pulse group has been applied thereto the bit pattern thereof has permuted, and wherein said read group is equal to the number of stages of said shift register and causes it to put out said permuted bit pattern thereof to said receptacle, electronic memory means connected to receive as serial bits and store said permuted bit pattern from said shift register during said read interval, preprogrammed array means for providing a bit pattern predetermined to correspond to a valid permuted bit pattern stored in said electronic memory means during said read interval, comparator means connected to said electronic memory means and to said preprogrammed array means for comparing the bit pattern stored in said memory means with said predetermined array bit pattern to determine equivalence or non-equivalence, and system identification confirmation output means connected to said comparator means and responsive to determined equivalence in said comparator means.

13. The identification system set forth in claim 12 wherein said shift register of said key comprises a series of tandem-connected flip-flops connected into a ring counter, a series of bit switches each connected to a flip-flop and arrayed to provide said initial predetermined bit pattern and wherein said initialization circuit functions to load said initial predetermined bit pattern into said flip-flops.

14. The identification system set forth in claim 12 wherein said key further comprises counter means connected to receive said initial group of pulses from said clock means, and gate means connected and enabled by said counter means to pass said serial stream permuted bit pattern to said memory means for storage therein.

15. The identification system set forth in claim 12 further comprising in said receptacle a successive tests enabling circuit comprising test repetition means for successively storing and comparing said serial stream permuted bit pattern and a succession of flip-flops which are reset to zero by the determination of equivalence by said comparator means and which are incremented successively by the determination of non-equivalence by said comparator means, and alarm means connected to respond to said flip-flops when the last thereof becomes incremented.

* * * * *